J. GAYLEY.
METHOD OF EXTRACTING MOISTURE FROM AIR.
APPLICATION FILED DEC. 6, 1904.
970,453.
Patented Sept. 13, 1910.
3 SHEETS—SHEET 1.
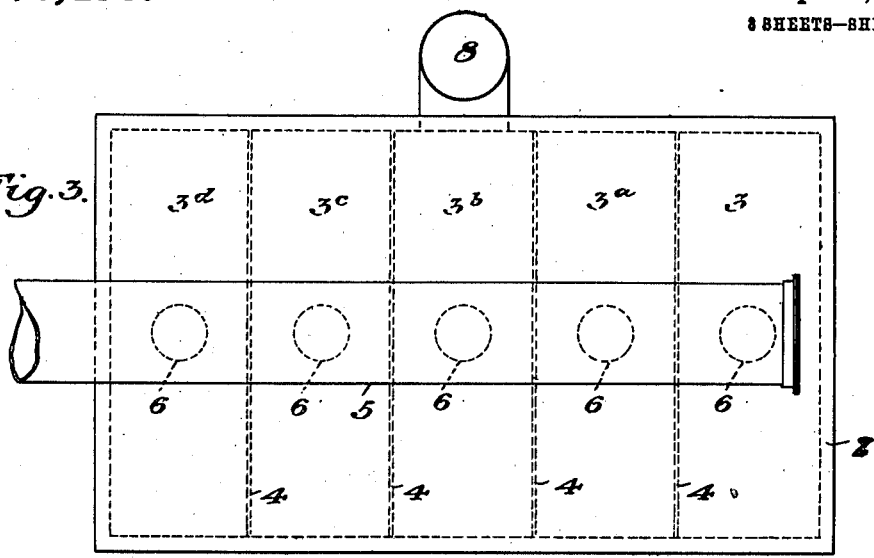
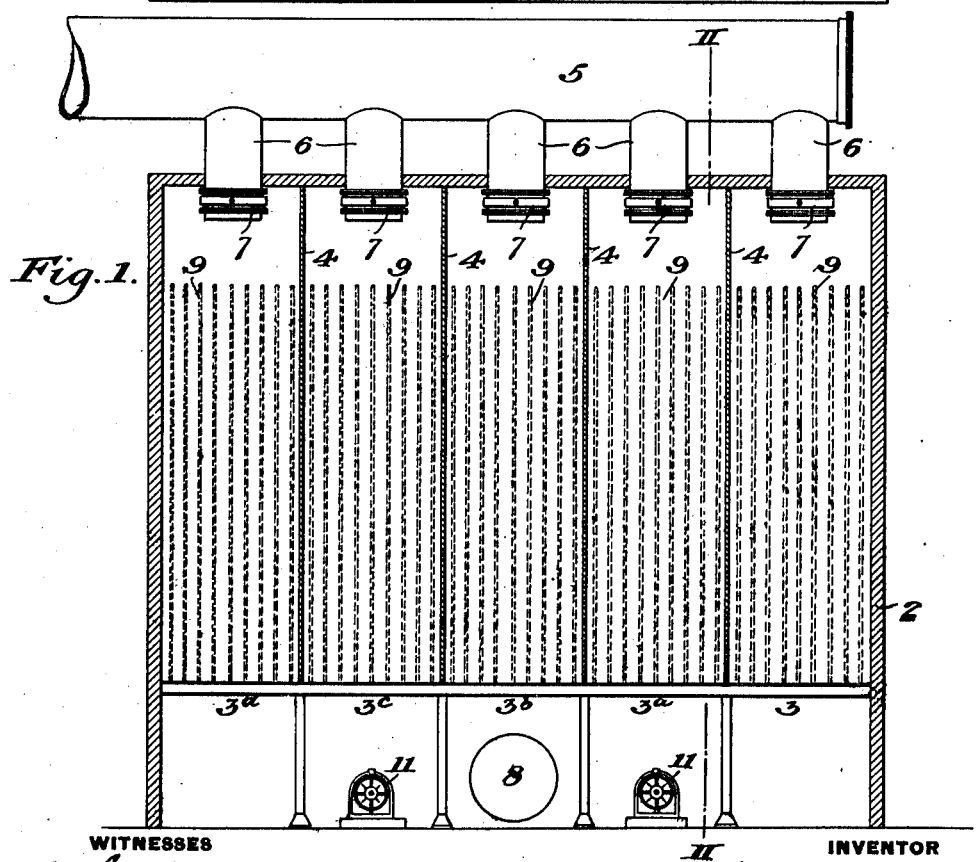
WITNESSES
INVENTOR

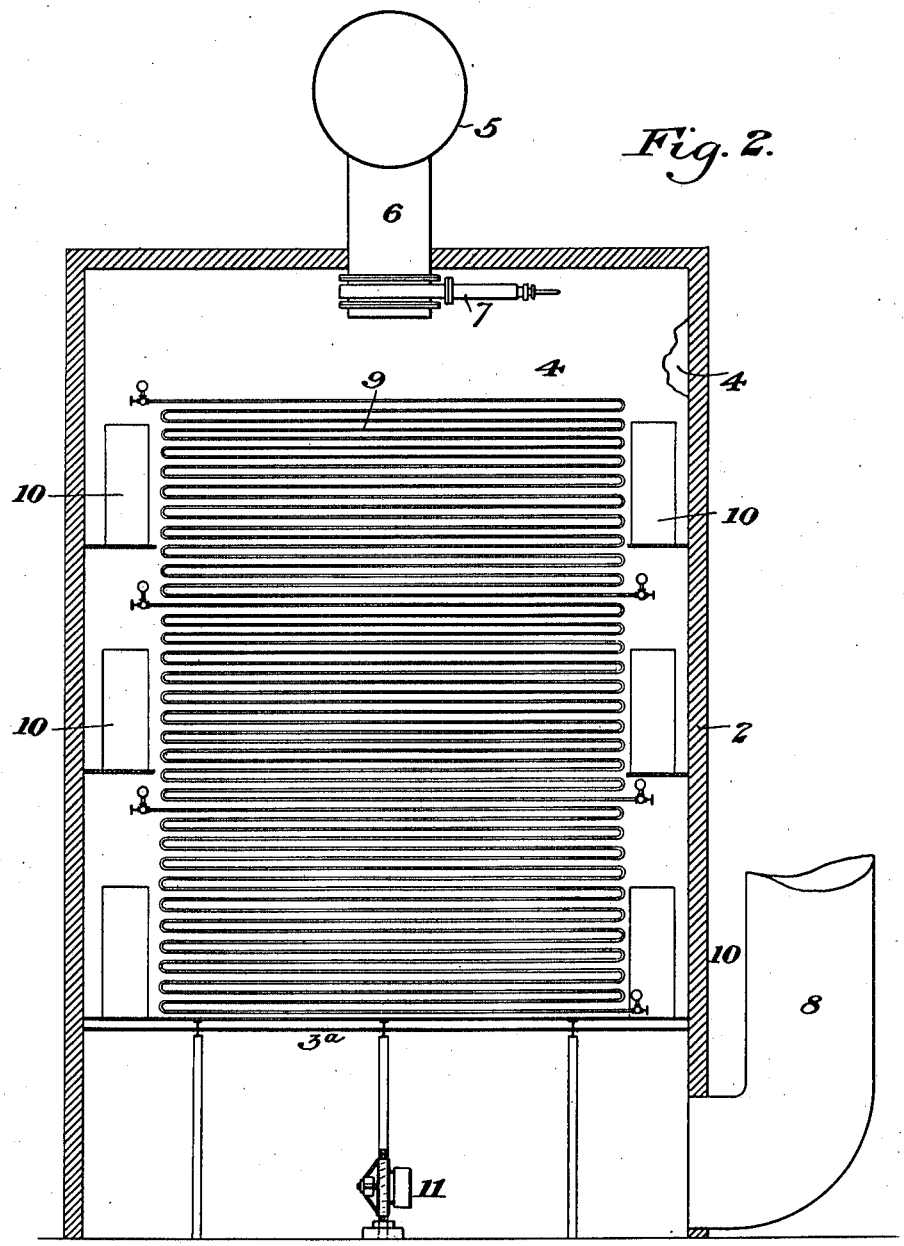

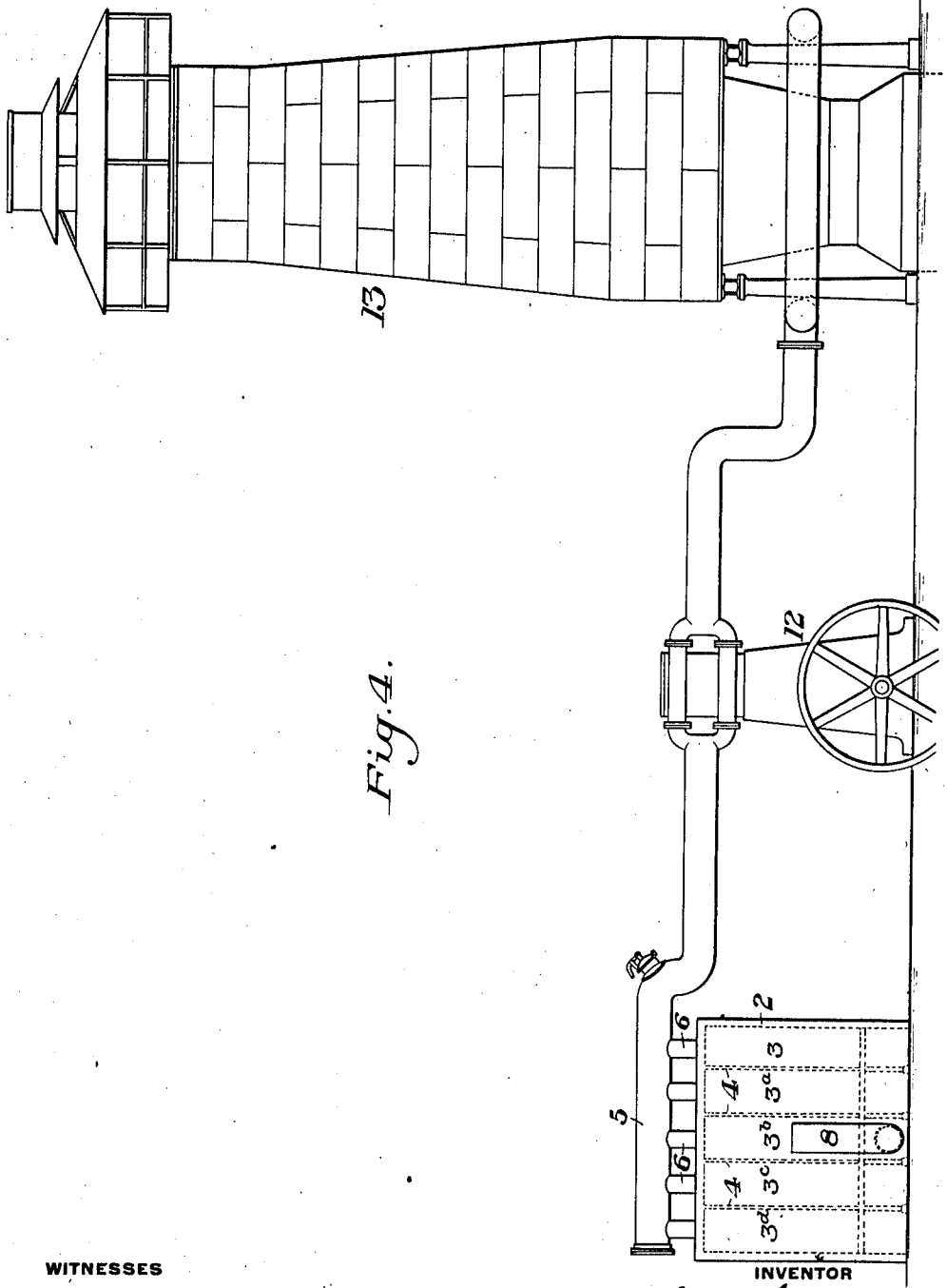

UNITED STATES PATENT OFFICE.

JAMES GAYLEY, OF NEW YORK, N. Y.

METHOD OF EXTRACTING MOISTURE FROM AIR.

970,453.  Specification of Letters Patent.  Patented Sept. 13, 1910.

Application filed December 6, 1904. Serial No. 235,764.

*To all whom it may concern:*

Be it known that I, JAMES GAYLEY, of New York, in the county of New York and State of New York, have invented a new and useful Method of Extracting Moisture from Air for Use in the Arts, of which the following is a full, clear, and exact description, reference being had to the accompanying drawings, forming part of this specification, in which—

Figure 1 is a vertical longitudinal section of refrigerating chambers suitable for practicing my invention; Fig. 2 is a vertical cross-section on the line II—II of Fig. 1; Fig. 3 is a plan of the chamber roof, and Fig. 4 is a side elevation showing the arrangement of the refrigerating apparatus, the blowing engine, and the furnace or place of use.

My invention relates to the method of drawing air for use in blast furnaces, converters, etc., by refrigeration; and is designed to provide an improved method therefor in which certain difficulties with the formation of frost or snow on the refrigerating pipes are lessened and the method made more efficient and practicable.

In carrying out my invention, I provide a series of separate refrigerating compartments or sections having their refrigerating pipes, and use a majority of these chambers for freezing out the moisture and reducing it to a small and substantially uniform percentage, while the smaller number of chambers are cut out and are being thawed to remove the insulating blanket of congealed moisture on the pipes. I also preferably direct the air upwardly through the sections and transversely to the pipe, so that the moisture will fall backwardly by gravity and not be carried on to deposit on the pipes.

A further feature of my invention lies in combining the use of several sections, any of which may be cut out for thawing, with the drawing of air by the blowing engine from the refrigerating apparatus, this blowing engine being located between the refrigerating apparatus and the point of use. I also preferably use a congealable liquid for thawing the moisture off from the pipes in the sections, and also provide antechambers for giving access to the pipes.

In the drawings, 2 represents a refrigerating room or chamber, the bottom portion of which forms one common complete chamber. The remainder of the room is divided into sections or compartments by means of partitions 4. Each compartment is connected with the dried air outlet pipe 5, by means of a pipe 6, controlled by a valve 7 of any suitable construction. The air enters the bottom common chamber through an inlet pipe 8, and is distributed in the common bottom chamber, fans 11 being used for increasing this distribution, if desired.

Each compartment or section is provided with a coil or coils of pipe 9, through which a refrigerating liquid is adapted to be passed, and the several sections are preferably connected with each other by doors 10, at the sides, leading through the partitions 4 beyond the pipe coils, which only fill the central portion of the compartment.

As shown in Fig. 4, the outlet pipe 5 leads to a blowing engine 12, by which the air is drawn from the refrigerating apparatus and forced to the blast furnace 13, or other point of use.

When all of the sections or compartments are in operation, the air entering through the inlet pipe 8 is distributed in the common bottom chamber and then rises through the separate compartments, where it is refrigerated and its moisture deposited, and is thence drawn through the pipes 6 and the pipe 5 to the blowing engine 12. It arrives at the blowing engine with a small and substantially uniform moisture content, on account of the low temperature (preferably zero degrees C.) to which it is reduced, and is forced by the blowing engine to the furnace or point of use under pressure imparted by the blowing engine.

When it is desired to thaw the frost, snow, or ice from the coils in any one of the compartments, the doors 10 of that compartment and the valves 7 therefor are closed, and the insulating blanket of congealed moisture is thawed off by passing liquid through the coil or in any other desirable way. The refrigerant is then re-introduced into the coil and when sufficient time has elapsed to refrigerate and dry the air within the chamber, the valve and doors are again opened.

While I have described my invention as applied to the refrigeration and drying of air, it may also be applied to the drying of producer gas or other gases.

The advantages of my invention result from the drawing of air by the blowing engine from a series of compartments, the majority of which are used for drying air, while a smaller number are being thawed off. The locating of the blowing engine between the refrigerating chamber and the point of use gives better uniformity of weight and moisture at the engine which measures the air in connection with the use of the several compartments. The proper distribution of the air is aided by the common chamber communicating with the separated compartments. The passage of the air current transversely of the pipes gives efficient cooling action, while its upward direction causes gravity to act upon the moisture carrying it back onto the less cold portions of the pipe, instead of forward into the colder portions, where it is congealed.

Many changes may be made in the form and arrangement of the apparatus without departing from my invention.

I claim:

1. The method of supplying air or other gases, in which the moisture is reduced to a small and practically uniform percentage, consisting in providing a series of more than two refrigerating compartments, passing air or gases through the majority of said compartments, refrigerating it therein and feeding it directly therefrom to the dried air outlet, thawing the previously deposited frost or congealed moisture from the refrigerating conduits in a smaller number of chambers, while preventing the flow of air from these chambers to the dried air outlet, drawing the air from the refrigerating compartments to the blowing engine and thence forcing it to the point of use under pressure, substantially as described.

2. The method of supplying air or other gases, in which the moisture is reduced to a small and practically uniform percentage, consisting in passing the air or gases over the major amount of refrigerating surface arranged in separated compartments, causing said air or gases to pass transversely to the pipes in said compartments, refrigerating it therein and feeding it directly therefrom to the dried air outlet, depositing the moisture as frost on the refrigerating conduits, and thawing the previously deposited frost from the minor amount of refrigerating surface in other chambers while preventing the flow of air directly from these chambers to the dried air outlet, drawing the air from the refrigerating chambers to a blowing engine, and forcing said air from the blowing engine under pressure to the point of use, substantially as described.

3. The method of drying air by refrigeration, consisting in feeding the air upwardly through a series of refrigerating compartments, drawing the air from said compartments to a blowing engine, and forcing it to the point of use, and thawing the minor number of refrigerating compartments as desired while the major number are refrigerating the air, substantially as described.

4. The method of drying air by refrigeration, consisting in introducing the air into a bottom chamber common to several upper compartments containing refrigerating conduits, thence feeding the air upwardly through said compartments and depositing the moisture as frost, drawing the air from said compartments to a blowing engine and forcing it from the blowing engine under pressure to the point of use, substantially as described.

In testimony whereof, I have hereunto set my hand.

JAMES GAYLEY.

Witnesses:
J. W. ALLEN,
W. S. REED.